United States Patent [19]

Brodard et al.

[11] Patent Number: 4,572,821
[45] Date of Patent: Feb. 25, 1986

[54] APPARATUS FOR DISSOLVING OZONE IN A FLUID

[75] Inventors: Eric Brodard, Rueil Malmaison; Jean-Pierre Duguet, Le Pecq; Joël Mallevialle, Carrieres sur Seine; Michel Roustan, Ramonville, all of France

[73] Assignee: Societe Lyonnaise des Eaux et de l'Eclairage, Paris, France

[21] Appl. No.: 609,552

[22] Filed: May 7, 1984

[30] Foreign Application Priority Data

May 10, 1983 [FR] France .................. 83 07764

[51] Int. Cl.$^4$ ............................ C02F 1/78; C02F 1/50
[52] U.S. Cl. ..................... 422/186.12; 210/760; 422/186.08
[58] Field of Search .................. 422/186.07, 186.08, 422/186.11, 186.12, 186.14, 186.23; 204/176; 210/198.1, 199, 758, 760, 256

[56] References Cited

U.S. PATENT DOCUMENTS

| | | | |
|---|---|---|---|
| 1,594,946 | 8/1926 | Hartman | 422/186.07 |
| 3,925,176 | 12/1975 | Okert | 210/707 |
| 3,945,918 | 3/1976 | Kirk | 210/712 |
| 4,141,830 | 2/1979 | Last | 422/186.3 |
| 4,156,652 | 5/1979 | Wiest | 422/186.12 |
| 4,176,061 | 11/1979 | Stopka | 210/760 |
| 4,233,152 | 11/1980 | Hill et al. | 210/760 |
| 4,255,257 | 3/1981 | Greiner et al. | 210/760 |
| 4,273,660 | 6/1981 | Beitzel | 210/760 |
| 4,282,172 | 8/1981 | McKnight | 210/760 |
| 4,317,044 | 12/1982 | Vaseen | 422/186.07 |
| 4,332,687 | 6/1982 | Daignault et al. | 210/721 |
| 4,412,924 | 11/1983 | Feather | 210/760 |

Primary Examiner—Stephen J. Lechert, Jr.
Assistant Examiner—Howard J. Locker
Attorney, Agent, or Firm—Wenderoth, Lind & Ponack

[57] ABSTRACT

An apparatus for dissolving ozone in a fluid includes a vertically extending closed chamber, and at least one tube extending vertically into the chamber and having a lower end opening into the chamber. Fluid to be treated and ozonized gas is introduced into the upper end of the tube, such that the fluid and gas pass downwardly through the tube, are discharged from the lower end of the tube into a lower end of the chamber, and then passed upwardly through the chamber, whereby ozone dissolves in the fluid. Structures are provided at the upper end of the chamber for discharging fluid having dissolved therein the ozone and excess gas.

14 Claims, 3 Drawing Figures

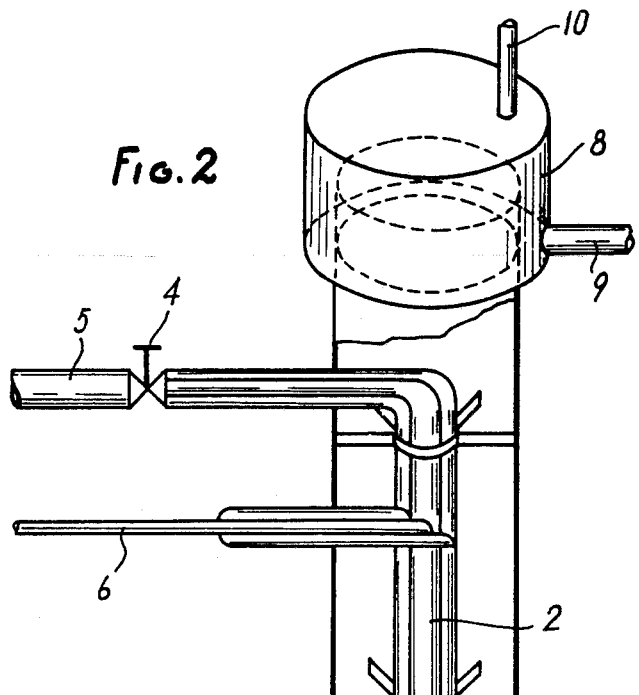
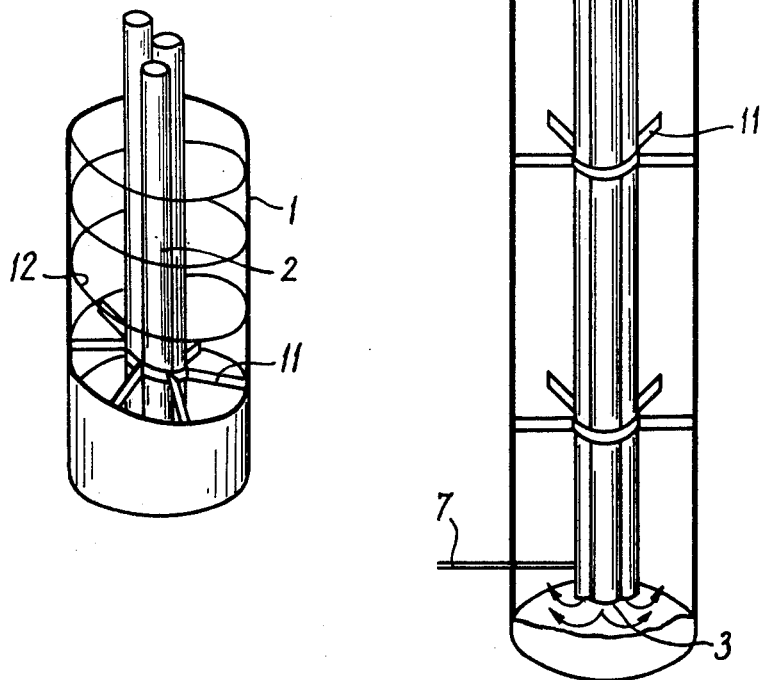

APPARATUS FOR DISSOLVING OZONE IN A FLUID

BACKGROUND OF THE INVENTION

The present invention relates to an apparatus for the dissolution of ozone in a fluid by injecting thereinto an ozonized gas, for example ozonized air or oxygen. The present invention more particularly is directed to such an apparatus which is suitable for the ozonization of water, especially water to be fit for human consumption, or for the purification of gases charged with toxic compounds, e.g., aldehydes.

Numerous devices have been proposed in the past to enable ozone to be dissolved in a fluid, and more particularly, in water. In such known devices ozonized air normally is dispersed in the water in the form of bubbles in one or more contact chambers by means of nozzles, branched collectors with orifices or porous bodies, with co-current or counter current flow of the water to be treated. These known devices however have the following disadvantages: preferred passageways for the ozonized air bubbles and water are produced in the contact chambers; the air/water contact is nonuniform; and the transfer or contact time between the ozone and the water is insufficient. Additionally, since the pressure diminishes with the rising of the ozonized air bubbles, the dissolution of the ozone in the water is reduced.

Other known devices include injectors that exhaust the ozonized air in vacuum or at low pressure and deliver it with the water to be treated into a contact chamber, thereby creating a turbulence. Also proposed have been several types of turbines that enable the ozonized air to be emulsified in the water to be treated. These turbine devices ensure an adequate dissolution of the ozone into the water, but they inherently encounter difficulties in regulating the pressure of the injected ozonized air. In addition, such devices require bulky machinery, such as motors and booster compressors made of specially corrosion-resistant materials. Furthermore, these types of devices consume a considerable amount of energy.

SUMMARY OF THE INVENTION

With the above discussion in mind, it is an object of the present invention to provide an apparatus for the dissolution of ozone in a fluid for the ozonization thereof, whereby it is possible to overcome the above and other prior art disadvantages.

It is a further object of the present invention to provide such an apparatus which enables the ozone to dissolve in the water at a greater pressure, while ensuring a longer time of contact between the ozonized gas bubbles and the water than is possible with prior art devices.

These objects are achieved in accordance with the present invention by the provision of an apparatus including a vertically extending closed chamber, at least one tube extending vertically into the chamber and having a lower end opening into the chamber, means for introducing fluid, for example water, to be treated and means for introducing ozonized gas, for example ozonized air, into an upper end of the tube. As a result, the fluid and gas pass downwardly through the tube, are discharged from the lower end into the lower end of the chamber, and then pass upwardly through the chamber, whereby the ozone dissolves in the fluid. At the upper end of the chamber is provided means for discharging the fluid having dissolved therein the ozone and means for discharging excess gas. By this arrangement, it is possible to ensure a greater pressure, thereby to enhance the dissolution of the ozone into the water.

Preferably, there are provided at least two tubes within the chamber, and further preferably plural tubes are provided in an arrangement of at least one bundle or cluster. The tube or tubes are arranged at the axis of the tubular chamber.

The chamber preferably is in the form of a tubular chamber having a vertical height of from 10 to 100 meters and a diameter of from 0.5 to 5 meters. The tube or tubes extend throughout substantially the entire internal height of the chamber and have a total diameter of less than 50 centimeters.

Advantageously, each tube can be provided with a supply pipe for introducing an additive fluid, for example a catalyst.

The upper end of the chamber is provided with an arrangement, connected thereto supply pipe for supplying an additive, for for example an overflow weir, to achieve discharge of the ozonized water.

The upper end of each tube communicates with a conduit for the supply of the fluid to be treated, for example water, by respective hit-or-miss or selectively operable gate valves provided for each tube. This arrangement enables the water to be distributed in an optimum number of the tubes in order to achieve a desired flow velocity of the water of between 0.5 and 1 m/s, preferably approximately 0.7 m/s.

In an arrangement in accordance with the present invention wherein the ozonized gas is oxygen, the ozonized gas supply pipe for each tube is arranged to join the tube at a position above the chamber, i.e. the tubes extend outwardly through the upper end of the chamber.

In another arrangement of the present invention wherein the ozonized gas is air, the ozonized gas supply pipe for each tube extends into the chamber and is connected to the tube at a position within the chamber.

Preferably, the flow of ozonized gas is less than 25% of the flow of fluid to be treated, such as water. The total diameter of the tube or tubes in the chamber preferably is between 20 and 30 centimeters.

In accordance with an advantageously arranged feature of the present invention, the vertical tubes are arranged in a bundle attached to the inner wall of the tubular chamber by a plurality of vanes. These vanes may be positioned in a manner to impart a rotating motion to the fluid and gas during the upward passage thereof through the chamber. Specifically, the vanes may be inclined to the horizontal, preferably at an angle from 30° to 60°. Alternatively, or additionally, there may be provided a spiral member arranged on the inner surface of the tubular chamber to impart the rotating motion, and thereby to increase the time of contact between the ozonized gas and the water.

The upper end or the lower end of each tube may have connected thereto a supply pipe for supplying an additive, for example a catalyst such as hydrogen peroxide, to promote the transfer of the ozone from the gas to the liquid.

BRIEF DESCRIPTION OF THE DRAWINGS

Other objects, features and advantages of the present invention will be apparent from the following detailed description, with reference to the accompanying drawings, wherein:

FIGS. 1 and 2 are schematic perspective views of embodiments of the apparatus of the present invention; and FIG. 3 is a partial perspective schematic view of a modification according to the present invention.

DETAILED DESCRIPTION OF THE INVENTION

Figure 1:
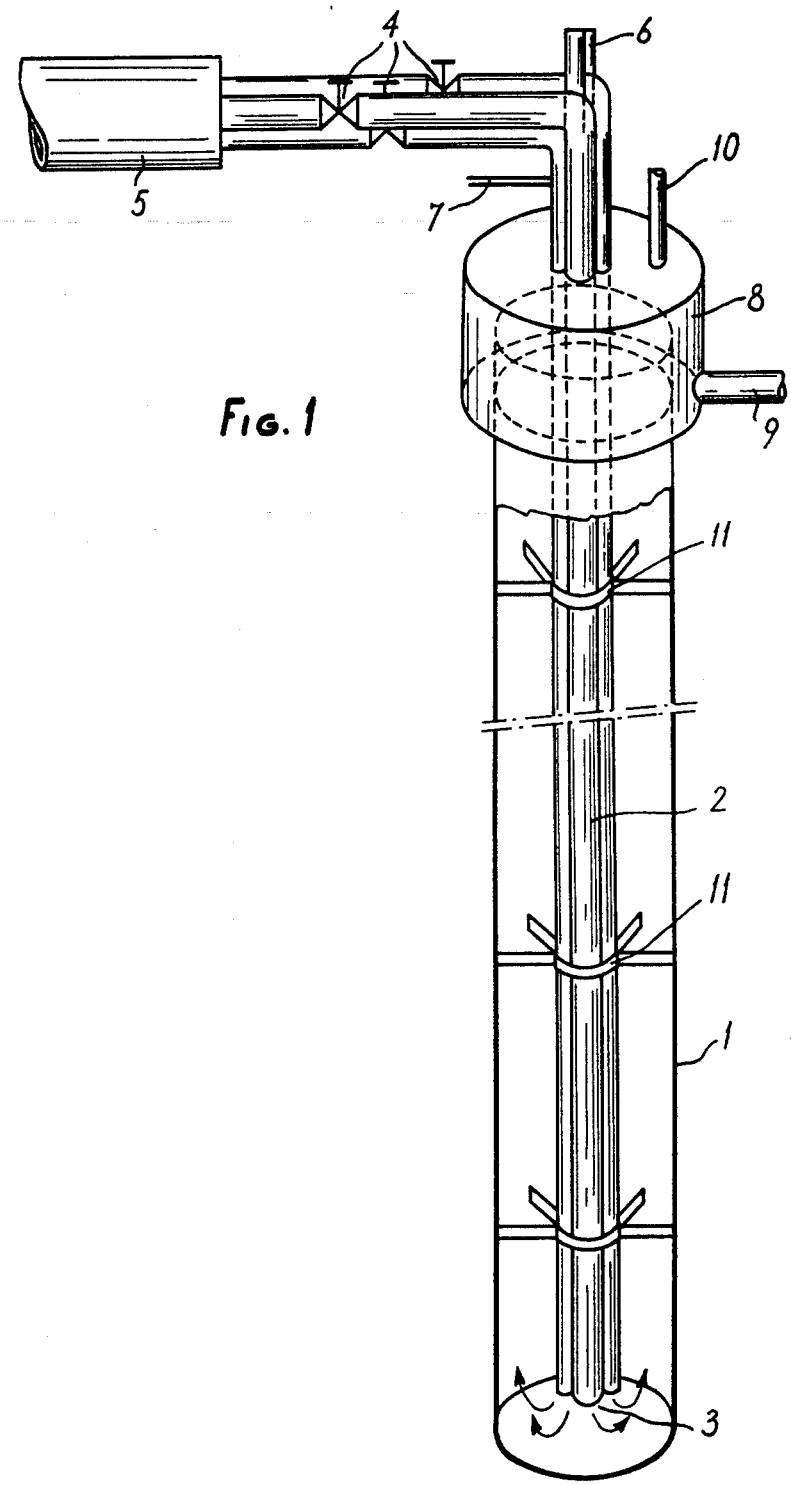

As shown in the drawings, the apparatus of the present invention includes a vertical tubular chamber 1 into which extends at least one vertical tube 2. In the illustrated arrangement, three tubes 2 in the form of a bundle or cluster are provided. It will be understood however that a number of tubes other than three may be provided. Each tube 2 has a lower end which opens into the bottom end of chamber 1. The upper end of each tube 2 extends from the chamber 1 and is connected to a source of supply, for example a conduit 5, of the fluid to be treated, for example water, by a respective hit-or-miss or selectively operable valve, such as a gate valve 4. Ozonized gas, for example ozonized air or oxygen, is fed into the upper part of each tube 2 by a respective pipe or conduit 6.

By this arrangement, the fluid to be treated, for example water, and the ozonized gas pass downwardly through each tube 2, are discharged from the lower ends of the tubes 2 into the lower end of chamber 1, and then pass upwardly through the chamber, whereby the ozone from the gas dissolves in the water. The water having the ozone dissolved therein is discharged from the upper end of the chamber. In the specifically illustrated arrangement, the upper end of the chamber opens into an enclosed housing 8, the water overflows the top of the chamber 1 in the form of a weir into an annular chamber therearound, and is discharged through a pipe 9. The excess gas is removed from the top of the chamber, for example from housing 8, by means of a discharge pipe 10.

In the arrangement shown in FIG. 1, the tubes 2 extend outwardly through the upper end of the chamber, and the fluid conduit 5 and the ozonized gas pipes 6 are connected to tubes 2 exteriorly of the chamber 1. On the other hand, in the arrangement of FIG. 2, the upper ends of the tubes 2 extend laterally or transversely from chamber 1 at a position beneath the upper end of the chamber. The gas pipes 6 extend transversely into the chamber 1 and are connected to the respective tubes 2 interiorly of the chamber.

A supply pipe 7 may be provided near the upper end (FIG. 1) or near the lower end (FIG. 2) to introduce an additive fluid, for example a catalyst, into the tubes 2.

The time of flow of the water in each tube 2 is approximately 30 seconds, and the velocity of flow in the tubes is approximately 0.7 m/s.

In accordance with a further feature of the present invention, there is provided means for imparting a rotating motion to the fluid and gas during the upward passage thereof through the chamber. Specifically, the bundle of tubes 2 are attached to the inner wall of chamber 1 by means of a plurality of vanes 11. Each vane may be inclined to the horizontal by an angle of from approximately 30° to 60°, thereby imparting a rotating motion to the fluid that rises in the chamber from the lower outlet ends of the tubes, thus increasing the amount of time of contact between the ozonized gas and the fluid to be treated. The same effect can be achieved, or such effect can be reinforced, by the provision of a spiral member 12 arranged on the inner surface of chamber 1, as illustrated schematically in FIG. 3. Advantageously, such a spiral would have a thickness of from 2 to 5 centimeters and a width of from 2 to 10 millimeters.

EXAMPLE

Comparative tests have been conducted on ozone dissolution in water by the use of an apparatus according to the present invention including a tubular chamber having a height of 25 meters and in which was arranged a bundle of two vertical tubes having a diameter of 3.7 centimeters, and by the use of a conventional column provided with porous bodies for the injection of ozonized gas. Under similar conditions of the quantities of ozone introduced into each liter of water, and with an identical flow ratio of the ozonized gas to the water to be treated, there have been obtained yields ranging from 85 to 100% with the apparatus according to the present invention for a contact time of one minute. On the other hand, employing the prior art apparatus at a contact time of 10 minutes resulted in yields ranging from 50 to 60%. The results of such tests are shown in the following table.

Although the present invention has been described and illustrated with respect to preferred features thereof, it is to be understood that various changes and modifications may be made, as will be apparent to those skilled in the art, without departing from the scope of the present invention.

| | Time of contact | Water flow | Ozonized gas flow | Velocity of water in the tubes | Ozone production | Ozone concentration at the outlet of the tubes | Yield |
|---|---|---|---|---|---|---|---|
| Conventional apparatus | 10 mn | 8.7 l mn$^{-1}$ | 1.2 l mn$^{-1}$ | — | 8.4 mg mn$^{-1}$ | — | 52% |
| | | | 0.4 l mn$^{-1}$ | — | 2.8 mg mn$^{-1}$ | — | 56% |
| Apparatus according to the invention | 1 mn | 100 l mn$^{-1}$ | 4.3 l mn$^{-1}$ | 0.80 ms$^{-1}$ | 63 mg mn$^{-1}$ | 0.61 mg/l | 100% |
| | | | 9.4 l mn$^{-1}$ | 0.80 ms$^{-1}$ | 102 mg mn$^{-1}$ | 0.99 mg/l | 97% |
| | | | 12.8 l mn$^{-1}$ | 0.80 ms$^{-1}$ | 134 mg mn$^{-1}$ | 1.10 mg/l | 85% |

We claim:

1. An apparatus for the dissolution of ozone in a fluid for the ozonization thereof, said apparatus comprising:
   a vertically extending closed tubular chamber having a vertical height of from 10 to 100 m and a diameter of from 0.5 to 5 m;
   at least one tube extending vertically into said chamber and having a lower end opening into said chamber, said at least one tube extending throughout substantially the entire height of said chamber and having a diameter of less than 50 cm;
   means for introducing fluid to be treated and means for introducing ozonized gas into an upper end of said tube, whereby said fluid and said gas pass downwardly through said tube, are discharged from said lower end of said tube into a lower end of said chamber, and then pass upwardly through said chamber, whereby ozone dissolves in said fluid;

means for discharging from an upper end of said chamber said fluid having dissolved therein said ozone; and means for discharging excess gas from said upper end of said chamber.

2. An apparatus as claimed in claim 1, further comprising supply pipe means for introducing an additive into said at least one tube.

3. An apparatus as claimed in claim 1, further comprising means for imparting a rotating motion to said fluid and gas during the upward passage thereof through said chamber.

4. An apparatus as claimed in claim 3, wherein said imparting means comprise vanes fastening said at least one tube to an inner wall of said chamber, each said vane being inclined to the horizontal by an angle of from 30° to 60°.

5. An apparatus as claimed in claim 3, wherein said imparting means comprises a spiral member arranged on the inner surface of said chamber.

6. An apparatus as claimed in claim 1, wherein said at least one tube is positioned along the vertical axis of said chamber.

7. An apparatus as claimed in claim 1, wherein said upper end of said at least one tube is connected to said fluid introducing means by a valve.

8. An apparatus as claimed in claim 1, wherein said at least one tube extends outwardly through said upper end of said chamber, and said fluid introducing means and said gas introducing means are connected to said at least one tube exteriorly of said chamber.

9. An apparatus as claimed in claim 1, wherein said upper end of said at least one tube extends transversely from said chamber at a position beneath said upper end of said chamber, and said gas introducing means extends transversely into said chamber and is connected to said at least one tube interiorly of said chamber.

10. An apparatus as claimed in claim 1, comprising plural said tubes arranged in at least one bundle within said chamber.

11. An apparatus as claimed in claim 10, wherein said bundle of tubes is positioned along the vertical axis of said chamber.

12. An apparatus as claimed in claim 10, wherein said upper end of each said tube is connected to said fluid introducing means by a respective valve.

13. An apparatus as claimed in claim 10, wherein all of said tubes extend outwardly through said upper end of said chamber, and said fluid introducing means and said gas introducing means are connected to all of said tubes exteriorly of said chamber.

14. An apparatus as claimed in claim 10, wherein said upper ends of all of said tubes extend transversely from said chamber at a position beneath said upper end of said chamber, and said gas introducing means extends transversely into said chamber and is connected to all of said tubes interiorly of said chamber.

* * * * *